United States Patent [19]

Gerlach et al.

[11] Patent Number: 4,708,799
[45] Date of Patent: Nov. 24, 1987

[54] HOLLOW FIBER MEMBRANE FOR PLASMA SEPARATION

[76] Inventors: Klaus Gerlach, Friedenstr. 30, 8750 Aschaffenburg-Obernau; Erich Kessler, Breubergweg 33, 6128 Hoechst; Werner Henne, Winterbergstr. 46, Wuppertal, all of Fed. Rep. of Germany

[21] Appl. No.: 777,844

[22] Filed: Sep. 17, 1985

Related U.S. Application Data

[63] Continuation of Ser. No. 601,259, Apr. 17, 1984, abandoned, which is a continuation of Ser. No. 296,187, Aug. 25, 1981, abandoned, which is a continuation-in-part of Ser. No. 283,673, Jul. 15, 1981, abandoned.

[30] Foreign Application Priority Data

Jul. 15, 1980 [DE] Fed. Rep. of Germany ....... 3026718

[51] Int. Cl.⁴ .................. B01D 39/00; D02G 3/00
[52] U.S. Cl. .................. 210/500.23; 210/500.36; 264/41; 264/209.1; 428/376; 428/398
[58] Field of Search ................. 428/376, 398; 210/500.2, 321.1–321.5, 433.2, 927, 500.23, 500.22, 500.36; 264/41, 209.1, 561; 55/16, 158; 422/48

[56] References Cited

U.S. PATENT DOCUMENTS 4,020,230 4/1977 Mahoney et al. ............ 210/500.2 X
4,056,467 11/1977 Christen et al. ............. 210/500.2 X
4,082,658 4/1978 Fritzsche et al. ............ 210/500.2 X
4,214,020 7/1980 Ward et al. .................... 427/296
4,290,987 9/1981 Soehngen et al. .............. 428/376 X
4,401,567 8/1983 Shindo et al. .................. 428/376 X Primary Examiner—Lorraine T. Kendell

[57] ABSTRACT

A method for production of porous hollow polymer fiber membranes. A homogeneous mixture is prepared from at least two components where one component is a fusible polymer (10 to 30 percent) and a solvent component (70–90%) is inert relative to the polymer and where said components form a binary system having in the liquid state a region of complete miscibility as well as a miscibility gap. The mixture is extruded at a temperature above the phase segregation temperature of the mixture through a hollow fiber nozzle into a spinning tube containing a solvent inert to the polymer and having a temperature below the segregation temperature. Fiber and liquid are moved in the spinning tube in the same direction at about the same speed. After solidification the hollow fiber membrane is washed with a solvent.

A liquid mixture containing biological cells and macromolecules is passed through the membrane produced for filtration and a filtration factor for human blood proteins with molecular weights of from about 60,000 to 3 million results of at least about 0.7.

32 Claims, 1 Drawing Figure

HOLLOW FIBER MEMBRANE FOR PLASMA SEPARATION

This is a continuation of application Ser. No. 601,259, filed Apr. 17, 1984, which is a continuation application of Ser. No. 296,187, filed Aug. 25, 1981, which in turn is a continuation-in-part of application Ser. No. 283,673, filed on July 15, 1981, all abandoned.

BACKGROUND OF THE INVENTION

1. Field of the Invention

The present invention relates to porous hollow fiber membranes for the separation of plasma, that is to plasmapheresis of blood and in particular of human blood.

2. Brief Description of the Background of the Invention Including Prior Art

The medical research is to an increasing degree interested in the question of the nature of the constituents of the blood in order to be able to improve the therapeutical methods of treatment. In this context both the quantitative as well as the quantitative composition of the blood is of interest as well as their changes, be it caused by sickness or other influences and of interest are also the changes of composition caused by elimination processes such as for example by way of hemodialysis.

The hemodialysis by way of the artificial kidney has experienced an incomparably strong increase over the last fifteen years and the hemodialysis has lengthened considerably the live of nephropathic persons as well as of those who have lost for one reason or another their kidneys. Many persons owe their being alive solely to the functioning of a membrane for the elimination of metabolic decomposition products from the blood by way of dialysis.

These chemically prepared semipermeable membranes, the most important of which is the cuprophane membrane comprising regenerated cellulose, imitate the separation process of natural membranes within the human body in an approximate way to such an extent that these chemically prepared semipermeable membranes are capable of substituting for a non-operating, sick or underfunctioning organ.

The concentration difference of the so-called metabolites between the blood side and the water side of the membrane induces a steady diffusion of the substance from the blood, and the molecular size of the substance diffusing is determined by the kind of porosity of the dialysis membrane The same principle prevails relative to an infinite number of cell and organ membranes within the human body.

The nephrologists have learned to operate in this context the process of extracorporeal blood circulation, that is the extension of the human blood circulation to a branch outside of the human body and they have created thereby the basis for a further reaching elimination process such as the hemofiltration.

In the hemofiltration by way of an artificial kidney the metabolites are removed by way of a membranein such a way that the filtrate containing the metabolites having passed through the membrane is discarded in large volumes such as for example 20 liters. The large amount of filtrate volume has to a large extent to be substituted by a physiological sodium chloride solution in order to protect the blood from an intolerable thickening.

In both cases, that is with the hemodialysis and with the hemofiltration the membrane is not allowed to pass protein materials, the most common representative of which is albumin (molecular weight about 68,000) and that means the membrane has to be tight for this size of molecule.

Medical research has recognized that many illness are caused by toxins which are frequently attached to proteins. The toxins themselves are frequently small molecules, which would pass freely the mentioned dialysis and hemofiltration membranes if the toxins were present free and unattached.

By way of the protein attachment, however, they represent molecules of such size which cannot be eliminated by the above mentioned membranes and to these proteins belong also the immunocomplexes and the antigens.

In order to remove such protein-attached toxins with a molecular weight between from about 100,000 to 3,000,000 there existed in the past only the process of plasma-separation by way of the ultracentrifuge. An allowable amount of blood was removed from the patient into a bag, the contents of the bag was filled into the ultracentrifuge and the cellular parts were separated from the blood plasma. The cellular components such as red and white blood cells as well as blood platelets are returned to the patient after thinning and the plasma including the dissolved components is discarded and in this way the toxic materials are eliminated.

The same process is inter alia also presently still employed with healthy blood donors in order to obtain plasma for the purpose of the plasma exchange with patients.

The blood separation into cells and plasma therefor has two different areas of application, that is the elimination of protein bound toxins and the production of plasma for plasma exchange.

It would be desirable for the two cited areas of application to employ an extracorporeal hemofiltration at the patient or donor, which would allow to separate the plasma still containing all dissolved materials and returning directly to the patient or donor the fraction containing the cell components of the blood into the blood circulation. This however is preconditioned on the existence of membranes which have a permeability limit only at a molecular weight of about 3 million.

There are a few types of membranes, which are employed for this purpose such as the cellulose acetate the cellulose nitrate membrane and the polyvinylalcohol membrane. These however have only a limited or better called partial permeability for the recited proteins. The permeability can be expressed by way of the so-called filtration coefficient $$S = \frac{C_F}{C_B}$$

wherein $C_F$ = concentration of the component X in the filtrate
$C_B$ = concentration of the component X in the blood.

The determination of the filtration coefficient can be performed for example by way of laser-nephelometric analysis.

If $S = 1$, then a complete permeability is present if S is smaller than 1 then a partial permeability is present. The presently available membranes have filtration coefficients, which are already for albumin less than 0.8. This means that the elimination of the components to be separated takes place only in a diminished degree, therefor a longer treatment time is required. Also, one has to work with larger amounts in backinfusions or larger membranes have to be employed, which carries considerable disadvantages since such modules then exhibit a very large extracorporeal volume.

SUMMARY OF THE INVENTION

1. Purposes of the Invention

It is an object of the present invention to provide a membrane eliminating the disadvantages of the membranes of conventional construction.

It is another object of the present invention to provide a membrane capable of separating proteins dissolved in the blood and having molecular weights of up to about 2,500,000 or even up to 3,000,000, that this membranes having a high filtration coefficient for the molecular weight range of from about 60,000 to 2,500,000 or respectively 3,000,000 for human blood and which at the same time allow for a high flow rate of the filtrate.

It is a further object of the present invention to provide membranes where the filtrate flow is at least 1/5th of the blood flow through the filter module with the purpose that the times of treatment of the patient as well as the times for the blood donation remain within an allowable range, where the filtrate flow is determined at a pressure difference of 0.1 bar.

These and other objects and advantages of the present invention will become evident from the description which follows.

2. Brief Description of the Invention

The present invention provides for a method of production of porous hollow polymer fiber membranes. A homogeneous mixture is prepared from at least two components where one component is a fusible polymer present in the mixture in amounts of from about 10 to 30 weight percent and where a solvent component is a first liquid inert relative to the polymer and present in the mixture in amounts of from about 70 to 90 weight percent and where said components form a binary system having in the liquid state a region of complete miscibility as well as a miscibility gap. The mixture is extruded at a temperature above the segregation temperature of the mixture through a hollow fiber nozzle into a spinning tube containing a second liquid inert to the polymer and having a temperature in the spinning tube below said segregation temperature. The fiber and the second inert spinning liquid are moved in the same direction and at about the same or only slightly different linear speed through the spinning tube. The fiber is removed under low tension from the spinning tube. After solidification of the fiber a washing can be performed with a suitable solvent.

The first liquid inert to the polymer and the second liquid inert to the polymer can have an identical chemical composition. The speed gradient between the fiber and the spinning liquid while passing the spinning tube can be less than about 15 percent. Preferably, the fiber and the second spinning liquid are passed through the spinning tube with the same linear speed. The fiber can be withdrawn from the spinning tube with a speed of from about 5 to 15 percent higher than the speed resulting without pulling at the exit of the spinning tube.

After the solidification the fiber can be washed in a pressure washing step for removing inert liquid. The fiber can be wound in parallel and the fiber can be washed in parallel position. An air gap between the exit face of the hollow fiber nozzle and the surface of the inert liquid in the spinning tube can be maintained and preferably the air gap has a width of from about 3 mm to 5 mm.

A preferred polymer is polypropylene. The first and second inert liquid can comprise secondary amines. Conditions can be maintained such that the resulting pores in the membrane pass macromolecules having a molecular weight of at least about 2,000,000 and the hollow fibers are preferably formed for plasma separation.

A porous hollow fiber in accordance with the present invention can have a volume part comprising at about 70 volume percent pores, an inner fiber diameter of from about 100 to 550 micron and a wall thickness of from about 15 to 300 micron. The filtration factor for proteins in the human blood in the molecular weight of from about 60,000 to 3,000,000 can be at least 0.7. It is preferred to provide for a filtration factor of from about 0.9 to 1.0 for the membrane and such factor of from about 0.9 to 1.0 is preferered for human blood proteins range of molecular weights from about 1,000,000 to 2,500,000. Preferred hollow fibers are from polypropylene have a volume of hollow pores in the fiber of at least 75 percent of the fiber. The inner diameter of the fiber can be from about 250 to 450 micron. The wall thickness of the hollow fiber is preferably from about 100 to 200 micron and the fiber is preferably impermeable to blood cells. The flow of filtrate is at least about 0.2 of the blood flow through the filter membrane, if the flow of the filtrate is determined at a pressure difference of 0.1 bar.

There is also provided a method of filtration which comprises passing a liquid mixture containing biologic cells and macromolecules through a membrane of porous holow polymeric fiber having a pore volume of at least about 70 percent, an inner fiber diameter of from about 100 to 550 micron, a wall thickness of from about 15 to 300 micron and a filtration factor for human blood proteins in the range of molecular weights from about 60,000 to 3 million of at least about 0.7. The retained liquid mixture containin the biological cells can be collected and the filtrate containing the macromolecules can be collected. Preferably the liquid mixture is blood, the macromolecules comprise blood proteins and the biological cells comprise blood cells filtration can be a plasmapheresis of blood and at least about 0.2 of the blood flow can pass through the membrane, where the blood flow is determined at a pressure difference of 0.1 bar.

The novel features which are considered as characteristic for the invention are set forth in particular in apppended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which is shown one of the various possible embodiments of the invention.

DESCRIPTION OF INVENTION AND PREFERRED EMBODIMENTS

Figure 1:
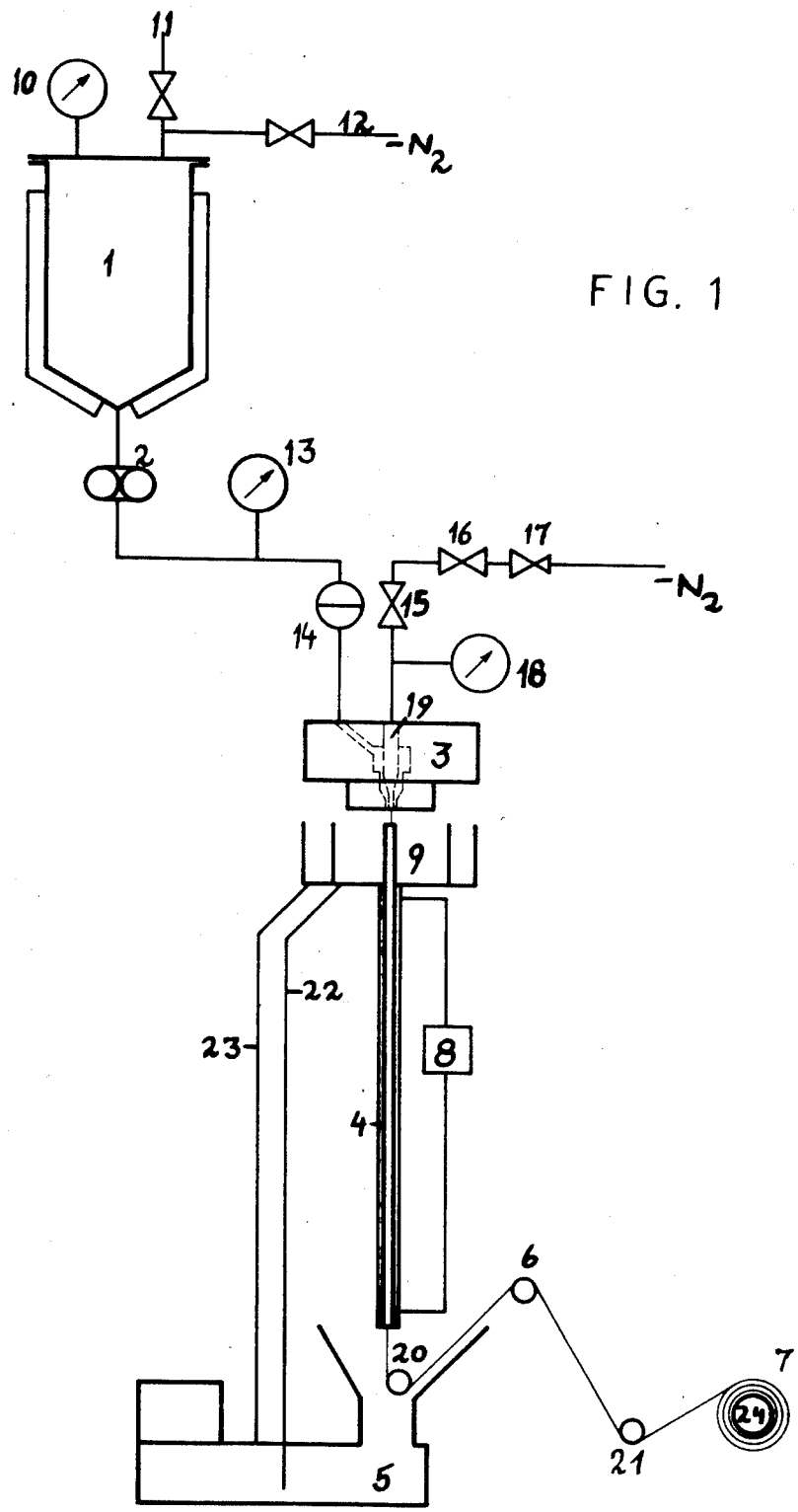
FIG. 1 is a schematic diagram of an apparatus suitable for performing the invention.

In accordance with the present invention there is provided a method for the production of porous hollow fiber membranes for the plasma separation. A homogeneous mixture of at least two components, where one component is a fusible polymer present in amounts of from about 10 to 30 volume percent and where the second component is an inert liquid relative to the polymer and present in an amount of from about 70 to 90 volume percent and where the mixture in the liquid state has a state of complete miscibility as well as a miscibility gap, is extruded at a temperature above the segregation temperature of the phases through a hollow fiber nozzle into a spinning tube, which comprises the inert liquid of the extruded component mixture. The temperature inside the spinning tube is below the phase segregation tempertaure and the spinning tube guides the fiber and the inert liquid at about the same or only slightly different linear speed and thereupon the fiber is withdrawn from the spinning tube under slight tension. Preferably the tension is in the range from about 5 to 10 gr. After solidification the hollow fiber is washed with a solvent.

Preferably, the speed difference between the fiber and the spinning liquid in the spinning tube is less than about 15 percent. In some cases it is even advantageous if the fiber and the inert liquid are guided through the spinning tube with the same linear speed.

Advantageously, the fiber is withdrawn from the spinning tube at a speed, which is about from 5 to 15 percent higher than the speed which would result without pulling of the fiber at the exit point of the spinning tube. This allows to keep the tension very low. It is very advantageous to subject the fiber after solidification to a pressure washing for removal of the inert liquid. Advantageously, the fiber is wound in parallel positions and then washed.

It is also advantageous to maintain an air gap between the exit face of the hollow fiber nozzle and the surface of the inert liquid in the spinning tube and preferably the width of the gap is from about 3 to 5 mm, that is fairly small.

Another object of the invention is a hollow fiber membrane for plasmapheresis characterized by a porous polypropylene hollow fiber with a volume part of hollow pores amounting to at least 70 percent, with an inner fiber diameter of from 100 to 550 micron, with a wall thickness of from about 15 to 300 micron and with a filtration factor for the proteins of human blood with a molecular weight of from about 60,000 to 3 million of at least 0.7.

Preferably the filtration factor amounts to 0.9 to 1. The filtration factor can amount to even nearly one for the proteins of the human blood having a molecular weight of from about 1 to 2.5 million. Advantageously, the volume of the hollow pores of the membrane amounts to at least about 75 volume percent. Suitable membranes have an inner diameter of from about 250 to 450 micron . The wall thickness is preferably from about 100 to 200 micron. The membrane is impermeable to blood cells that is erythrocytes, leucocytes and blood platelets (thrombocytes).

The following method can be employed for the production of the hollow fiber membranes in accordance with the present invention. The inert liquid is mixed with a corresponding amount of polymer, preferably polypropylene. A preferred inert liquid is NN-bis-(2-hydroxyethyl)hexadecylamine. The mixture is heated to the required temperature such as for example 220° C. for the preferred components and preferably the mixture is stirred and a vacuum is applied to remove from the solvent possibly present lower molecular weight components such as amines. After a certain time such as for example 2 hours a homogeneous, viscous solution is present suitable for processing In addition to the preferably employed polypropylene other additional polymers can be employed such as in particular polyolefins as well as high molecular weight polyethylene, copolymers of propylene and ethylene, polymers based on 3-methyl-pentene-(1), polyethylene-chlorotrifluoro-ethylene available under the tradename Halar and polyethylenesulfide.

It is recommended in a continuous production process to free the solvent from lower molecular components by way of evacuation prior to the solution step. The polypropylene is brought to the molten state via an extruder. Then heated liquid and molten polypropylene are fed to a mixer such as for example a pin-mixer. It is recommended for better mixing to pass the mixture through a cylinder from sintered metal.

The melt, preferably maintained under an inert gas such as for example nitrogen, or the mixture is then fed to a pump, which serves to move the mixture. A usual hollow fiber nozzle is employed as a nozzle, which is preceded by a filter and preferably by a filter of sintered metal. An air gap is advantageously present between the exit face of the nozzle and the liquid surface in the spinning tube and the gap can be from about 3 to 5 mm wide. Thus the gap should be as narrow as possible, but in certain cases it may have a larger width sich as for example 30 mm.

The homogeneous mixture having a temperature of about 220° C. is then extruded through the hollow fiber nozzle and after passing the air gap immerses into the inert liquid disposed in the spinning tube. The temperature of the liquid in the spinning tube is below the phase segregation temperature of the extruded mixture and is preferably from about 30 to 60 ° C. Nitrogen is entered through the hollow fiber nozzle into the inner of the hollow fiber in a way known in principle. The entering of nitrogen through a hollow fiber nozzle into a fiber is disclosed in e.g. U.S. Pat. No. 3,081,490 cf. FIGS. 4, 5, 6 and 11.

It is advantageous if the amount of nitrogen fed through the hollow fiber nozzle is precisely controlled. It is possible to control the uniformity of the produced fiber via the measurement of the nitrogen used. Irregularities in the use of nitrogen in fact indicate disturbances in the fiber production such as for example thin fiber walls and the like. The spinning tube is continuously fed with liquid, an overflow provides for a constant level of liquid in the spinning tube. The hollow fiber and the inert liquid are guided in the same direction through the spinning tube with a velocity of for example 20 m/min. It is also possible to control the speed in the spinning tube by way of the viscosity of the inert liquid, which can be varied by controlling the temperature of the inert liquid. It has been found to be particularly advantageous to set temperatures of from about 35° to 70° C. in the spinning tube.

The inert liquid and the hollow fiber leave the spinning tube at the lower end, where the hollow fiber is withdrawn with a speed which is only slightly higher than the speed at which the fiber would leave the spinning tube without a special mechanical pulling. This speed can be determined very simply by allowing the fiber to bulge slightly below the redirecting roll upon withdrawal and the speed resulting thereby increases by about from 5 to 15 percent.

For redirecting there is particularly advantageously employed a redirecting roll having a ball bearing, which is preferably provided with grooves adapted to the cross-section of the fiber. It is advantageous if the surface of the roll is very smooth.

Two additional rolls preferably follow the redirecting roll which in particular are to avoid that variations, which can occur in the coiling and receiving of the fiber, do propagate into the spinning tube. The withdrawal is preferably performed with three rolls. The three rolls can be covered with foam, which is to provide good adhesion and which is to avoid slipping. The fiber is then fed to a dancer lever, which feeds the fiber in a parallel winding to the coiling construction.

Advantageously, the spinning tube is surrounded with a jacket containing a liquid for maintaining constant temperature. Preferably, the temperature maintaining liquid has a temperature which is lower than the temperature of the liquid at the start of the spinning tube, thereby the fiber is cooled during the passage through the spinning tube and in addition it is avoided that the temperature within the spinning tube increases.

It is advantageous if the spinning nozzle is located exactly centered relative to the spinning tube in order to avoid that the fiber touches the wall of the spinning which could result in spinning disturbances and spinning irregularities as well as irregularities of the fiber.

The inner diameter of the spinning tube filled with inert liquid and the outer diameter of the hollow fiber should be adapted to each other, since thereby the flow velocity in the tube can be influenced. Advantageously, the inner diameter of the spinning tube is from about 2 times to 10 times the outer diameter of the hollow fiber.

The length of the spinning tube can be varied over a wide range and advantageous lengths are in the range of from about 1 to 3 m, however other lengths are not to be excluded.

It is advantageous if the exit speed or respectively the amount transported at the nozzle and the conditions in the spinning tube are such adapted to each other that the flow velocity of fiber and inert liquid amount to about from 5 to 25 m/min in the spinning tube.

Then the fiber is fed to a coiling construction via a dancer lever and it is advantageous to deposit the fiber a parallel disposition onto the coiling construction, and in particular onto corresponding coils. The fiber is then washed with a solvent capable of dissolving the inert liquid. It is advantageous if during this step the fiber on the coils is subjected to a pressure washing. Ethanol, isopropanol and acetone are particularly suited as washing liquids and ethanol is preferred.

It was particularly surprising to find that the hollow fiber membranes produced in accordance with the method of the present invention can be employed in plasmapheresis in an outstanding way and that they allow a simple and rapid separation of blood plasma on the one hand and of blood cells and blood platelets on the other hand without thereby removing from the plasma other materials such as for example proteins. It is possible to produce hollow fiber membranes for the plasmapheresis which exhibit a filtration factor of nearly about 1 for most components of the blood with the exception of blood cells and blood platelets. Therefor, with the membranes in accordance with the present invention it is possible to separate blood cell such as leucocytes, erythrocytes and blood platelets from the blood without inducing at the same time also a separation of proteins dissolved in the plasma from the blood.

Thus in the case of the treatment of healthy blood on the one hand a valuable complete plasma is obtained and on the other hand it is possible to feed back the blood cells and the blood platelets directly to the blood donor. Of course, this way also the plasma could be fed back to the donor and the blood cells could be enriched and produced.

This allows in addition to subject the blood plasma to additional fractionations and that thereby practically all proteins can be obtained from the plasma by corresponding methods of fractionation.

The filtration factor thereby remains constant over extended times.

It is further possible to remove toxins attached to dissolved proteins from sick patients by way of the membrane of the present invention and to feed back to them into the blood stream healthy plasma or corresponding other solutions. Also, the treatment can be performed in a very short time such that the patient or the donor have to be subjected only for a short time to the in principle unpleasant procedure of the withdrawal of blood.

The hollow fiber membrane in accordance with the present invention can be produced in a very simple and economic way such that thereby a low price, however very valuable, disposable throwaway article is produced. The cumbersome purification, cleaning and sterilization require with the centrifuge is eliminated when employing the membranes of the present invention.

The invention is further illustrated by way of the following examples and by the following description of FIG. 1.

EXAMPLE 1

1600 g (80 weight percent) N,N-bis-2-hydroxyethyl hexadecylamine (called in the following NBH) and 400 g (20 weight percent) polypropylene, type PPH 1050 natural, melt index 1.5 sold by Hoechst AG are heated to about 220° C. within an hour in a flat flange flask under stirring and a vacuum of from about 20 to 50 Torr. The mixture is stirred for another hour until a homogeneous melt or solution is obtained.

The hot homogeneous mixture is thereupon filled into the storage section (1) of the small volume spinning apparatus of FIG. 1. The total spinning apparatus is heated from the container at a temperature of about 210° C. falling toward the nozzle to a temperature of about 180 ° C. container is tightly sealed and is subjected to a nitrogen pressure of 1 bar. The melt is transported through the sintered metal filter (14) (pore size 50 to 70 micron) to the hollow fiber nozzle (3) by way of the gear pump (2). The mixture is pressed out of the nozzle into the shape of a hollow fiber. Nitrogen is inserted into the hollow fiber via a microvalve (15) through the bore hole (19) disposed in the middle of the stream of the molten mixture. The nitrogen pressure is measured between the microvalve (15) and the nozzle (3) and the nitrogen pressure is thereupon recorded. By way of this pressure sensor (18) having a rang of from about 0 to 10 millibar variations in the fiber and changes in the lumen can be recorded.

The parameters of the fiber are adjusted by controlling the melt-throughput, the nitrogen feed and the speed of withdrawal:

| | |
|---|---|
| Inner diameter = | 0.3 mm |
| Outer diameter = | 0.6 mm |

-continued

| | | |
|---|---|---|
| Wall thickness = | 0.15 | mm |
| Density of the melt = | 0.89 | g/cm³ |
| Melt throughput = | 4.24 | cm³/min |
| | 3.78 | g/min |
| Nitrogen feed = | 1.41 | cm³/min. NB |
| Speed of withdrawal = | 20 | m/min |

The nozzle exit speed of the fiber is 2.7 m/min for a nozzle bore of 1.8 mm and an outer diameter of the nozzle needle of 0.9 mm. The fiber is then spun into a spinning tube (4) standing vertically in a distance of 5 mm under the nozzle and the fiber is redirected at the roll (20) supported by ball bearings and is withdrawn at a constant rate with the withdrawal roll (6) at a speed of 20 m/min. After leaving the withdrawal roll (6) the fiber is wound up with the winding machine (7) in parallel onto a perforated disc coil (24). The coiling speed is controlled by way of the dancer arm (21). The NBH flowing through the spinning tube is adjusted in temperature to 50° C. in the thermostat (5) and is pumped through conduit (22) via overflow funnel (9) into the spinning tube (4). The excess NBH flows back via conduit (23) into the thermostat (5). The spinning tube (4) has an inner diameter of 5 mm and has a length of 2.30 meter. It is a double walled tube which is cooled over a length of 2 meters to 35° C. with the thermostat (8).

The temperature of the melt is at the nozzle exit point about 180° C. Under the above described conditions the flow velocity in the spinning tube (4) is from about 16 to 17 m/min.

In order to spin safely without allowing the fiber to bulge at the redirecting roll (20) of the spinning tube the fiber is withdrawn at a speed of 20 m/min.

The hollow fiber wound onto the perforated disc coil (24) (about 4 km/coil) is then washed in a pressure washing with ethanol for about 3 hours, where the coil is flushed at a pressure of from 0.5 to 0.8 bar with from 5 to 8 liter ethanol per minute.

EXAMPLE 2

Hollow fibers according to example 1 are collected to a bundle of about 2000 fibers, 30 cm long and are cast liquid sealed at both head ends into a tubular casing with polyurethane.

This filter module with an active filtering surface of 0.3 m² is passed by human plasma at a rate of about 50 ml/min. The transmembrane pressure was adjusted to 50 mmHg with a clamp at the exit point. The filtrate produced in amounts of 15 ml/min was withdrawn as small samples at time intervals of 10 minutes for determination of the concentration of the proteins, while the main part in each case was returned to the catch bag. The humane protein were determined quantitatively in the filtrate samples by way of lasernephelometric methods and the resulting concentrations were compared to those of the plasma in order to be able to calculate the filtration coefficient. The following values resulted:

| | |
|---|---|
| $S_{albumin}$ = | 0.98 |
| $S_{immunoglobulins\ IgG}$ = | 0.92 |
| $S_{Immunoglobulins\ IgM}$ = | 0.90 |
| $S_{\beta\text{-}lipoprotein}$ = | 0.96 |

The course in time was determined solely for $\beta$-lipoprotein with the following result:

| | S |
|---|---|
| After 10 minutes | 0.98 |
| After 20 minutes | 0.96 |
| After 30 minutes | 0.95 |
| After 40 minutes | 0.93 |
| After 50 minutes | 0.90 |
| After 60 minutes | 0.89 |
| After 120 minutes | 0.90 |

Blood cells could not be proven in the filtrate.

EXAMPLE 3

A small test module was constructed with fibers produced according to Example 1 having a surface of 100 cm² a length of 20 cm and the module was passed with a fresh unit of stored human blood at a rate of 3 ml/min in a single pass.

The filtrate was collected over a time span of 60 minutes and was then analysed regarding its components of protein. The filtration factors were as follows:

| | |
|---|---|
| albumin | 0.95 |
| immunoglobulin IgG | 0.91 |
| immunoglobulin IgA | 0.90 |
| $\alpha_2$-macroglobulin | 0.91 |
| immunoglobulin IgM | 0.94 |
| $\beta$-lipoprotein | 0.96 |

It can be recognized from the filtration factors that the proteins nearly completely pass through the membrane wall. No blood cells were present in the filtrate.

It will be recognized that each of the elements described above, or two or more together, may also find a useful application in other types of system configurations and cell and macromolecular separation procedures differing from the types described above.

While the invention has been illustrated and described as embodied in the context of a method for producing a hollow fiber and a method of filtration, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characterisitics of the generic or specific aspects of this invention.

What is claimed as new and desired to be protected Letters Patent is set forth in the appended claims:

1. A hollow fiber membrane for plasma separation comprising a porous hollow polymer fiber defining a volume part of at least 70% by volume pores, said porous hollow polymer fiber displaying an inner fiber diameter from about 100 to 550 micron and a wall thickness from about 15 to 300 micron and being a polymer selected from the group consisting of a polyolefin, a copolymer polyolefin, a halogen containing polyolefin and polyethylene sulfide, said volume part displaying a filtration factor for separation of marcomolecules from biological cells in a liquid mixture containing both, said filtration factor for proteins of human blood, being in the molecular weight range of from about 60,000 to 3,000,000, of at least about 0.7, said porous hollow polymer fiber being produced by a method comprising preparing a homogeneous mixture from at least two components where one component is a fusible polymer present in the mixture in amounts from about 10 to 30 percent by weight and where a solvent component is a first liquid inert relative to the polymer and present in the mixture in amounts of from about 70 to 90 percent by weight and where said components form a binary system having in the liquid state a region of complete miscibility and a miscibility gap; extruding the mixture at a temperature above the segregation temperature of the mixture through a hollow fiber nozzle into a spinning tube containing a second liquid inert to the polymer and having a temperature in the spinning tube below said segregation temperature; moving the fiber and the second inert spinning liquid in the same direction and with about the same or only slightly different linear speed through the spinning tube; and removing the fiber under low tension from the spinning tube.

2. The hollow fiber membrane according to claim 1 wherein the filtration factor is from about 0.9 to 1.0.

3. The hollow fiber membrane according to claim 1 wherein the filtration factor is from about 0.9 to 1 for human blood proteins in the range of molecular weights from about 1,000,000 to 2,500,000.

4. The hollow fiber membrane according to claim 1 wherein the polymer is polypropylene.

5. The hollow fiber membrane according to claim 1 wherein the volume of hollow pores in the fiber is at least about 80 percent of the fiber.

6. The hollow fiber membrane according to claim 1 wherein the fiber has an inner diameter of from about 250 to 450 micron.

7. The hollow fiber membrane according to claim 1 wherein the wall thickness of the hollow fiber is from about 100 to 200 microns.

8. The hollow fiber membrane according to claim 1 wherein the fiber is impermeable to blood cells.

9. The hollow fiber membrane according to claim 1 wherein the flow of filtrate is at least about 0.2 of the blood flow through the filter membrane, if the flow of the filtrate is determined at a pressure difference of 0.1 bar.

10. The hollow fiber membrane according to claim 1, further comprising said membrane being produced by also washing the formed hollow fiber structure after solidation with a solvent.

11. The hollow fiber membrane according to claim 1, wherein said membrane is being produced by having the first liquid inert to the polymer and the second liquid inert to the polymer having an identical chemical composition.

12. The hollow fiber membrane according to claim 1, wherein said membrane is produced by having the speed gradient between the fiber and the spinning liquid while passing the spinning tube is less than about 15 percent.

13. The hollow fiber membrane according to claim 1, wherein said membrane is produced by having the fiber and the second inert liquid being passed through the spinning tube with the same linear speed.

14. The hollow fiber membrane according to claim 1, wherein said membrane is produced by having the fiber withdrawn from the spinning tube with a speed of from about 5 to 15 percent higher than the speed resulting without pulling at the exit of the spinning tube.

15. The hollow fiber membrane according to claim 1, wherein said membrane is produced by also washing the fiber after its solidation with a pressure washing step for removing inert liquid.

16. The hollow fiber membrane according to claim 1, wherein said membrane is produced by also winding the fiber in parallel and washing the fiber in a parallel position.

17. The hollow fiber membrane according to claim 1, wherein said membrane is produced by also maintaining an air gap between the exit face of the hollow fiber nozzle and the surface of the liquid spinning tube.

18. The hollow fiber membrane according to claim 1, wherein said membrane is produced by having the width of the air gap being about 3–5 mm.

19. The hollow fiber membrane according to claim 1, wherein said membrane is produced by having the first and second inert liquid comprise secondary amines.

20. The hollow fiber membrane according to claim 1, wherein said membrane is produced by maintaining conditions so that the resulting pores in the membrane pass macromolecules having a molecular weight of at least about 2,000,000.

21. The hollow fiber membrane according to claim 1, wherein said membrane is produced so that the hollow fiber is formed for plasma separation.

22. The hollow fiber membrane according to claim 1, wherein the polymer is selected from the group consisting of polypropylene, a copolymer of propylene and ethylene, a polymer based on 3-methyl-pentene-(1) and polyethylene-chloro-trifluoroethylene.

23. A hollow fiber membrane for plasma separation comprising a porous hollow polymer fiber defining a volume part of at least 70% by volume pores, said porous hollow polymer fiber displaying an inner fiber diameter from about 100 to 550 micron and a wall thickness from about 15 to 300 micron and being a polymer selected from the group consisting of a polyolefin, a halogen containing polyolefin and polyethylene sulfide, said volume part displaying a filtration factor for separation of macromolecules from biological cells in a liquid mixture containing both, said filtration factor for proteins of human blood, in the molecular weight range of from about 60,000 to 3,000,000, of at least about 0.7.

24. The hollow fiber membrane according to claim 23, wherein the filtration factor is from about 0.9 to 1.0.

25. The hollow fiber membrane according to claim 23, wherein the filtration factor is from about 0.9 to 1 for human blood proteins in the range of molecular weights from about 1,000,000 to 2,500,000.

26. The hollow fiber membrane according to claim 23, wherein the polymer is polypropylene.

27. The hollow fiber membrane according to claim 23, wherein the volume of hollow pores in the fiber is at least about 80 percent of the fiber.

28. The hollow fiber membrane according to claim 23, wherein the fiber has an inner diameter of from about 250 to 450 micron.

29. The hollow fiber membrane according to claim 23, wherein the wall thickness of the hollow fiber is from about 100 to 200 microns.

30. The hollow fiber membrane according to claim 23, wherein the fiber is impermeable to blood cells.

31. The hollow fiber membrane according to claim 23, the flow filtrate is at least about 0.2 of the blood flow through the filter membrane, if the flow of the filtrate is determined at a pressure difference of 0.1 bar.

32. The hollow fiber membrane according to claim 23, wherein the polymer is selected from the group consisting of polypropylene, a copolymer of propylene and ethylene, a polymer based on 3-methyl-pentene-(1) and polyethylene-chloro-trifluoroethylene.

* * * * *